United States Patent
Gao et al.

(10) Patent No.: US 10,394,608 B2
(45) Date of Patent: *Aug. 27, 2019

(54) PRIORITIZATION OF LOW ACTIVE THREAD COUNT VIRTUAL MACHINES IN VIRTUALIZED COMPUTING ENVIRONMENT

(71) Applicant: International Business Machines Corporation, Armonk, NY (US)

(72) Inventors: Qunying Gao, Austin, TX (US); Peter J. Heyrman, Rochester, MN (US); Bret R. Olszewski, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/669,220

(22) Filed: Aug. 4, 2017

(65) Prior Publication Data
US 2017/0337092 A1 Nov. 23, 2017

Related U.S. Application Data

(63) Continuation of application No. 15/064,178, filed on Mar. 8, 2016, now Pat. No. 9,753,763, which is a continuation of application No. 14/972,647, filed on Dec. 17, 2015, now Pat. No. 9,753,760.

(51) Int. Cl.
*G06F 9/455* (2018.01)
*G06F 9/50* (2006.01)

(52) U.S. Cl.
CPC ........ *G06F 9/5038* (2013.01); *G06F 9/45558* (2013.01); *G06F 9/505* (2013.01); *G06F 9/5077* (2013.01); *G06F 2009/4557* (2013.01); *G06F 2009/45591* (2013.01)

(58) Field of Classification Search
None
See application file for complete search history.

(56) References Cited

U.S. PATENT DOCUMENTS

| | | | |
|---|---|---|---|
| 7,562,369 B1 * | 7/2009 | Salannone | G06F 9/54 719/328 |
| 8,418,180 B2 | 4/2013 | Bishop et al. | |
| 9,280,375 B1 * | 3/2016 | Youseff | G06F 9/50 |
| 2009/0235247 A1 * | 9/2009 | Cho | G06F 11/3423 718/1 |
| 2010/0153966 A1 * | 6/2010 | Arimilli | G06F 9/4856 718/105 |
| 2010/0325277 A1 * | 12/2010 | Muthiah | G06F 9/50 709/226 |
| 2012/0072972 A1 * | 3/2012 | Christiansen | H04L 63/0815 726/5 |
| 2012/0124576 A1 * | 5/2012 | Chiarannonte | G06F 9/5077 718/1 |

(Continued)

OTHER PUBLICATIONS

U.S. Patent and Trademark Office, Office Action issued in related U.S. Appl. No. 14/972,647 dated Dec. 23, 2016.

(Continued)

*Primary Examiner* — Dong U Kim
(74) *Attorney, Agent, or Firm* — Middleton Reutlinger

(57) ABSTRACT

Virtual machines with low active thread counts are prioritized during periods of high system load in a virtualized computing environment to improve the performance of such virtual machines.

20 Claims, 5 Drawing Sheets

(56) References Cited

U.S. PATENT DOCUMENTS

| | | | |
|---|---|---|---|
| 2012/0227042 A1 | 9/2012 | Zedlewski et al. | |
| 2013/0290511 A1* | 10/2013 | Tu ........................ | G06F 9/5072 |
| | | | 709/224 |
| 2014/0032761 A1* | 1/2014 | Beveridge ............. | G06F 9/5011 |
| | | | 709/226 |
| 2014/0047342 A1* | 2/2014 | Breternitz ............. | G06F 9/5061 |
| | | | 715/735 |
| 2014/0189685 A1* | 7/2014 | Kripalani ............. | G06F 9/45533 |
| | | | 718/1 |
| 2014/0282540 A1* | 9/2014 | Bonnet ............... | G06F 9/45558 |
| | | | 718/1 |
| 2014/0317617 A1* | 10/2014 | O'Donnell .......... | G06F 9/45533 |
| | | | 718/1 |
| 2015/0178116 A1* | 6/2015 | Jorgensen ............ | G06F 9/5077 |
| | | | 718/1 |
| 2015/0277947 A1* | 10/2015 | Busaba ............... | G06F 9/45558 |
| | | | 718/1 |
| 2016/0092268 A1* | 3/2016 | Gleyzer ............. | G06F 9/44505 |
| | | | 718/107 |

OTHER PUBLICATIONS

U.S. Patent and Trademark Office, Notice of Allowance issued in related U.S. Appl. No. 14/972,647 dated Apr. 27, 2017.
U.S. Patent and Trademark Office, Office Action issued in related U.S. Appl. No. 15/064,178 dated Dec. 23, 2016.
U.S. Patent and Trademark Office, Notice of Allowance issued in related U.S. Appl. No. 15/064,178 dated Apr. 27, 2017.
List of IBM Patents or Patent Applications Treated as Related.
U.S. Patent and Trademark Office, Office Action issued in related U.S. Appl. No. 15/669,203 dated Sep. 21, 2018.

\* cited by examiner

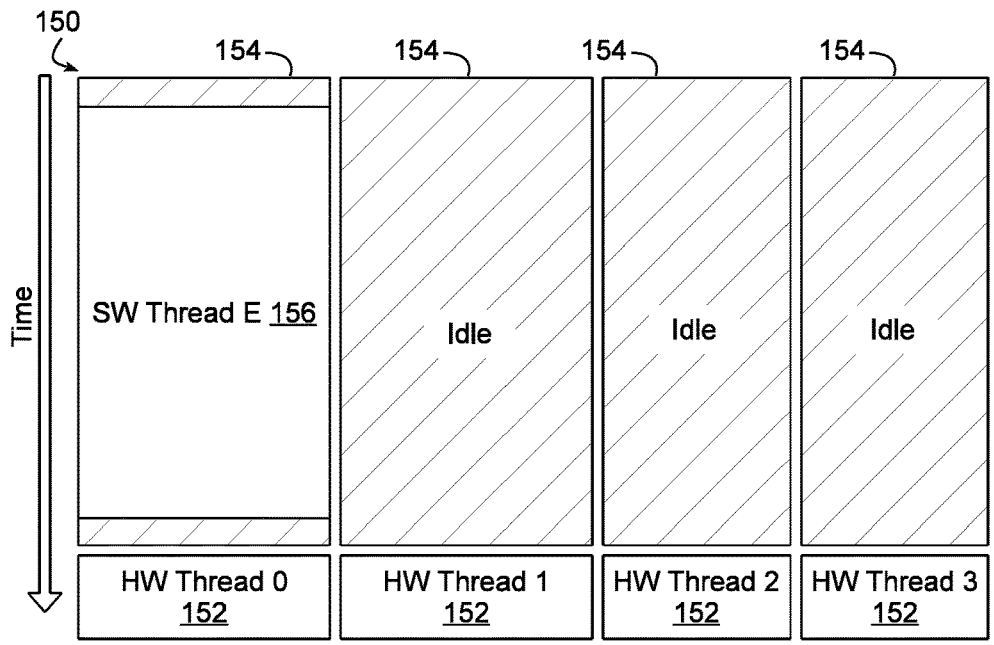
FIG. 4
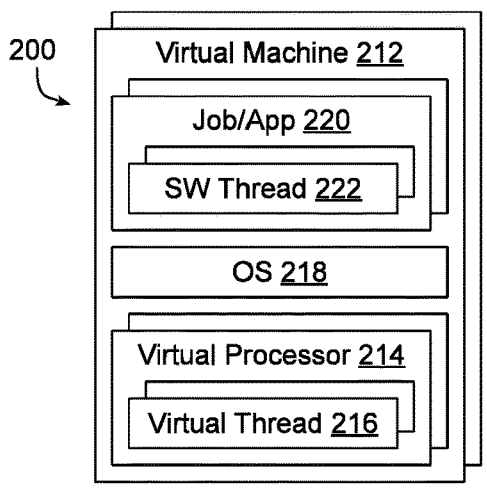
FIG. 5
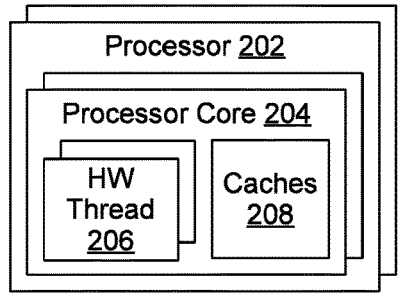

PRIORITIZATION OF LOW ACTIVE THREAD COUNT VIRTUAL MACHINES IN VIRTUALIZED COMPUTING ENVIRONMENT

BACKGROUND

The invention is generally related to computers and computer software, and in particular, to logically-partitioned and virtualized computing environments.

Computing technology has advanced at a remarkable pace, with each subsequent generation of computing system increasing in performance, functionality, and storage capacity, often at reduced cost. In addition, workload allocation of computing and other hardware resources is often employed to maximize the utilization of hardware resources such as processors, memories, networks, storage devices, etc., and thereby reduce the overall costs necessary for supporting a desired workload capacity. Optimizing workload allocation can also have a positive impact on power costs and environmental concerns due to a reduction in the amount of hardware resources required to support a given workload.

Many computer or data processing systems employ virtualization, also referred to as logical partitioning, which enables one or more individual physical computers to each run several operating environments, or operating systems, at once in a virtualized computing environment. In some instances, for example, a single physical computer, which may also be referred to as a host, can run a plurality of operating systems in a corresponding plurality of virtual machines (VMs), also referred to as logical partitions (LPARs). Each operating system resides in its own virtual machine, with each virtual machine allocated a part of a physical processor, an entire physical processor, or multiple physical processors from the computer. Additionally, a portion of the computer's memory may be allocated to each virtual machine. An underlying partition manager, often referred to as a hypervisor or virtual machine monitor (VMM), manages and controls the virtual machines. The hypervisor is typically a part of the system firmware and manages the allocation of resources to the operating systems and virtual machines. As such, one physical computer may run one or more virtual machines and thus virtualize the underlying hardware resources used by the applications, operating systems, and other program code configured to operate in those virtual machines.

Whenever multiple virtual machines share the same hardware resources, a hypervisor will alternate between these virtual machines using time slicing. With time slicing, a hypervisor schedules each virtual machine to execute for a portion of a dispatch window, such that each virtual machine is active for only a portion of each dispatch window. Each dispatch window, however, is only a fraction of a second, so all virtual machines appear to run simultaneously.

Many computer or data processing systems also rely on the use of multi-threaded processors to improve overall system throughput. With hardware multi-threading, multiple hardware threads of execution may be implemented in one or more processors, with each processor including one or more processor cores. When combined with virtualization, individual virtual machines may be allocated one or more hardware threads of execution, and multiple software threads within such virtual machines may be scheduled for execution on the allocated hardware threads of execution.

The operating systems resident in many virtual machines include load balancing functionality that distributes the workload of a virtual machine across the available hardware threads of execution to optimize overall throughput by the virtual machine. However, the workloads of some virtual machines, e.g., of virtual machines running some types of batch processes, may not be readily distributed among multiple hardware threads of execution, resulting in these virtual machines running in only a limited number of hardware threads of execution. Workloads with low active thread count virtual machines, particularly in times of high system load, generally cannot rely on load balancing functionality within the virtual machines themselves to optimize workload, which may lead to poor performance for these virtual machines.

SUMMARY

According to an embodiment of the present invention, virtual machines with low active thread counts may be prioritized during periods of high system load in a virtualized computing environment to improve the performance of such virtual machines. In particular, virtual machines may be scheduled in a virtualized computing environment by determining that a first virtual machine among a plurality of virtual machines active in the virtualized computing system has a low active thread count, determining that a high system load exists in the virtualized computing environment, and in response to determining that the high system load exists in the virtualized computing environment, prioritizing scheduling of the first virtual machine over at least one other virtual machine among the plurality of virtual machines active in the virtualized computing system based upon the determination that the first virtual machine has the low active thread count.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 4 is a block diagram illustrating another example workload for the virtual machine of FIG. 2 including a single software thread.

FIG. 5 is a block diagram of an example virtualized computing environment within which may be implemented low active thread count virtual machine prioritization consistent with the invention.

DETAILED DESCRIPTION

Figure 1A:
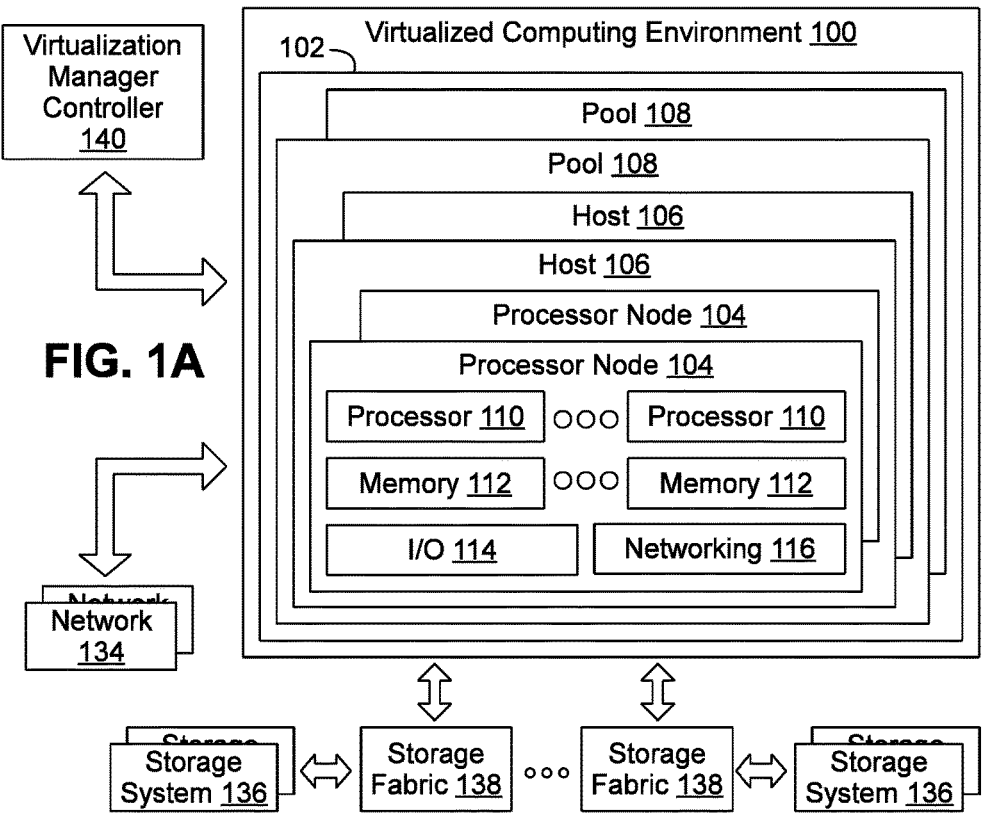
FIGS. 1A and 1B are block diagrams of an example hardware (FIG. 1A) and software (FIG. 1B) environment suitable for implementing a virtualized computing environment consistent with the invention.
Figure 1B:
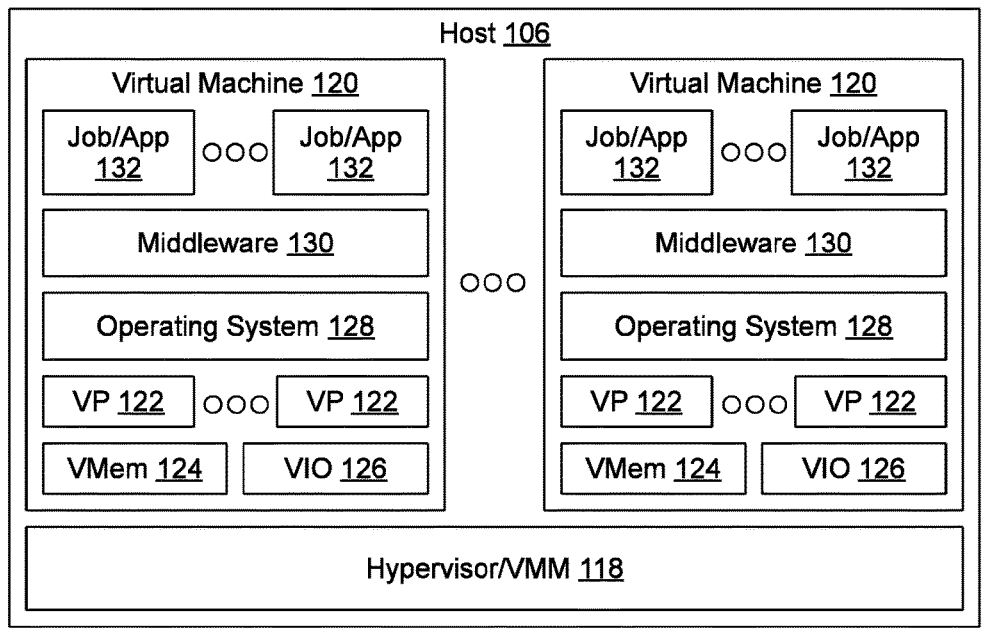

Turning to the Drawings, wherein like numbers denote like parts throughout the several views, FIGS. 1A-1B illustrate the principal hardware and software components in a virtualized computing environment or apparatus 100 consistent with the invention. As shown in FIG. 1A, apparatus 100 may include a multi-node data processing system 102 where the physical hardware is distributed among a plurality of physical processor nodes 104 disposed in a plurality of hosts or computer systems 106, with the hosts 106 disposed in one or more pools 108. Each processor node 104 includes one or more processors 110, one or more memory devices 112, and in some embodiments, additional hardware such as input/output (I/O) hardware 114 (e.g., one or more input/output (I/O) adapters) and/or networking hardware 116. Appropriate networking functionality (not shown) may also be used to provide data communication between the various processor nodes 104 and hosts 106, as well as other external systems.

Apparatus 100 may be implemented using any of a number of different architectures suitable for implementing a virtualized environment. For example, in one embodiment, apparatus 100 may include one or more of a Power 770, 780 or 795 system available from International Business Machines Corporation, the configuration of which will be apparent to one of ordinary skill in the art having the benefit of the instant disclosure. It will be appreciated, however, that other architectures suitable for executing virtualized environments may be used in other embodiments of the invention, so the invention is not limited to the particular architecture disclosed herein.

Each processor 110 may be implemented as a single or multi-threaded processor and/or as a single or multi-core processor, while each memory 112 may be considered to include one or more levels of memory devices, e.g., a DRAM-based main storage, as well as one or more levels of data, instruction and/or combination caches, with certain caches either serving individual processors or multiple processors as is well known in the art. In addition, the memory of apparatus 100 may be considered to include memory storage physically located elsewhere in apparatus 100, e.g., any cache memory in a processor, as well as any storage capacity used as a virtual memory, e.g., as stored on a mass storage device or on another computer coupled to apparatus 100.

Apparatus 100 operates under the control of one or more kernels, hypervisors, operating systems, etc., and executes or otherwise relies upon various computer software applications, components, programs, objects, modules, data structures, etc., as will be described in greater detail below. Moreover, various applications, components, programs, objects, modules, etc. may also execute on one or more processors in another computer coupled to apparatus 100 via network, e.g., in a distributed or client-server computing environment, whereby the processing required to implement the functions of a computer program may be allocated to multiple computers over a network.

For example, FIG. 1B illustrates various software components 118-132 that may be resident within a host 106 in apparatus 100. A hypervisor or virtual machine monitor (VMM) 118 may host one or more virtual machines (VMs) 120 and may allocate to each virtual machine 120 a portion of the physical hardware resources of host 106 (e.g., processor, memory and/or IO resources associated with one or more processor nodes 104), represented here by one or more virtual processors (VPs) 122, a virtual memory (VMem) 124 and virtual input/output (VIO) resources 126. Each virtual machine 120 may in turn host an operating system 128 and optionally middleware 130, as well as one or more jobs and/or applications 132. It will be appreciated that each virtual machine 120, which may also be referred to as a logical partition, virtual server or virtual computer, may operate in a manner that emulates a separate physical computer, and as such, may host practically any software components capable of being hosted by a computer.

Additional hardware and/or software components may also be resident in apparatus 100, e.g., mass storage hardware, external input/output devices such as printers or displays, and management hardware and/or software, e.g., a hardware management console (HMC) through which the hardware and/or software configuration of the apparatus may be managed by an administrator. Further, in the illustrated embodiments, connectivity to one or more external networks 134 may also be supported, as may connectivity to one or more storage systems 136 through one or more storage fabrics 138. Virtualized environments may be implemented in an innumerable number of manners, and may include an innumerable number of hardware and/or software variations, and as such, the invention is not limited to the particular implementation disclosed herein.

It will be appreciated that the present invention may be a system, a method, and/or a computer program product. The computer program product may include a computer readable storage medium (or media) having computer readable program instructions thereon for causing one or more processors to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the drawings illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, computer readable program instructions, of which one or more may collectively be referred to herein as "program code," may be identified herein based upon the application within which such instructions are implemented in a specific embodiment of the invention. However, it should be appreciated that any particular program nomenclature that follows is used merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the invention is not limited to the specific organization and allocation of program functionality described herein.

Those skilled in the art will recognize that the example environment illustrated in FIGS. 1A and 1B is not intended to limit the present invention. Indeed, those skilled in the art will recognize that other alternative hardware and/or software environments may be used without departing from the scope of the invention.

Low Active Thread Count Virtual Machine Prioritization

For a hypervisor in a virtualized computing environment that executes on a multi-threaded processor, when more virtual machines (and therefore more virtual processors) are active than physical processors (or processor cores), certain virtualization overheads may be incurred. Such overheads may be due to caching pressure on processor caches (as virtual machines time slice on the processors or processor cores) as well as due to scheduling decisions made by the hypervisor that result in accessing memory which resides in non-local caches or non-local memories. Such overheads may occur, for example, when virtual processors are moved between different physical processors or processor cores, as at least in part any data that has been cached by a virtual processor running on one physical processor or processor core will necessarily have to be re-loaded into any new physical processor or processor core to which the virtual processor has been moved. Generally, such overheads are most prevalent when the utilization of the physical system is high. At that stage, all of the mentioned factors may begin to impact the ability of individual virtual machines to complete instruction streams over time.

Figure 2:
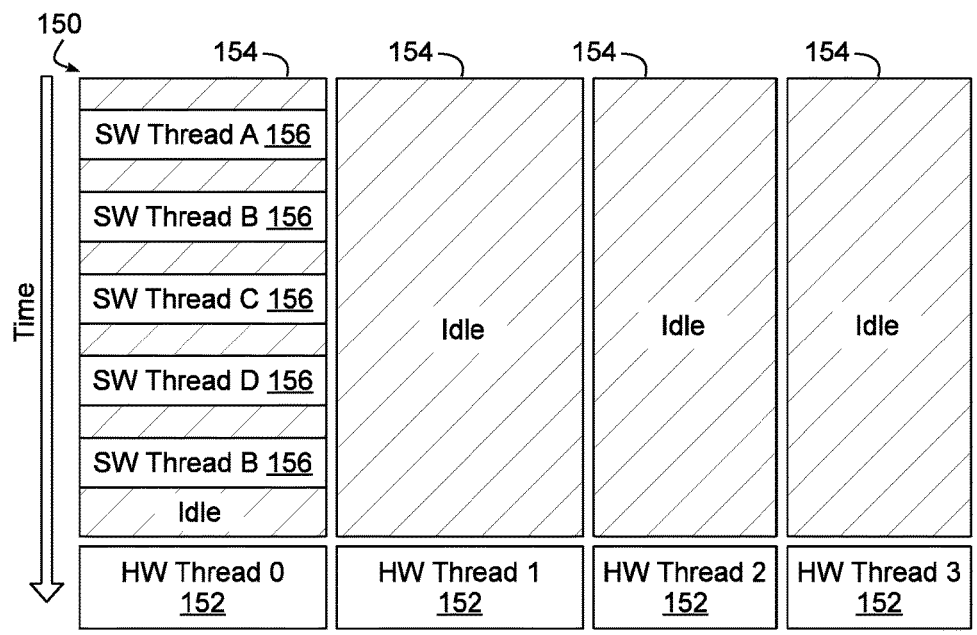
FIG. 2 is a block diagram illustrating an example workload including a set of software threads resident within a virtual machine to which is allocated three hardware threads of execution.

For many kinds of workloads, the multi-threading of the physical processors and/or processor cores acts as a shock absorber muting the cases where the underlying overheads begin to manifest themselves. On a multi-threading aware operating system in a virtual machine, the dispatching of software threads onto hardware threads of execution can change as the underlying performance of the virtual processor(s) allocated to the virtual machine changes. For example, consider a one virtual processor partition running a multi-threaded workload at low utilization (e.g., at 40%). In this case, on a physical processor core with four hardware threads/processor core, effectively only one or two of the hardware threads would generally be employed to run the workload, principally because the input workload will arrive at a rate where one or two hardware threads are all that is needed. FIG. 2, for example, illustrates such an environment, where a virtual machine 150 is allocated four hardware threads of execution 152 (HW Thread 0-HW Thread 3), each with a corresponding dispatch window 154, and where four software threads 156 (SW Thread A-SW Thread D) are dispatched to a single hardware thread of execution (HW Thread 0) (the order of such dispatches is from top to bottom of the figure as represented by the illustrated arrow). In such a scenario, dispatching all threads to the same hardware thread of execution may enable the other three hardware threads of execution to be parked, e.g., to optimize quality of service.

Figure 3:
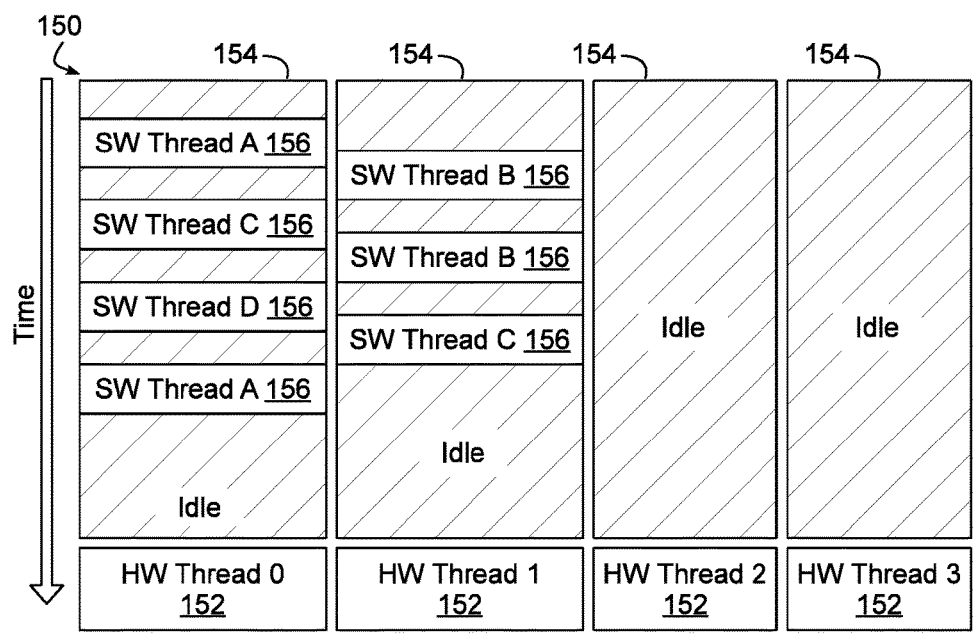
FIG. 3 is a block diagram illustrating an example distribution of the workload of FIG. 2 to multiple hardware threads of execution when under high system load.

In the case that the overlying physical processor slows down, e.g., due to virtualization impacts, the workload can exploit more of the hardware threads on the processor, as shown in FIG. 3, where at least a portion of the software threads 156 are dispatched to a second hardware thread of execution 152 (HW Thread 1). This "shock absorber" effect in many instances can offset customer-visible changes to response time for an application running in the virtual machine, but may result in higher reported virtual processor utilization.

However, as shown in FIG. 4, for a workload that has a small number of software threads active (e.g., a single software thread 156 (SW Thread E)), it may not be possible to employ this shock absorber effect, as there generally aren't enough active software threads to spread out onto the available hardware threads of execution. This case is typical, for example, of batch workloads, where a small, sometimes fixed, number of threads are doing large volumes of processing. It can also be the case or certain business intelligence workloads. These workloads will generally see their throughput reduced proportionately to the changes in delivered processor performance.

In embodiments consistent with the invention, these types of virtual machines, referred to herein as low active thread count virtual machines based upon the presence of a relatively low number of active software threads, are prioritized by a hypervisor during periods of high system load. The prioritization is generally in the form of biasing a scheduling algorithm used by a hypervisor in favor of virtual machines associated with low active thread counts. As will become more apparent below, virtual machines with low active thread counts may be prioritized in some embodiments by scheduling those virtual machines earlier in a dispatch window. Hypervisors in many instances tend to manage the time slices in a dispatch window allocated to virtual machines virtual assuming some usage of resources, meaning that in some instances certain virtual machines may be dispatched before others in the dispatch window. By placing the low active thread count virtual machines at the beginning of the window, those virtual machines are generally given more opportunity to run during the window. Moreover, whenever other virtual machines do not use up all of their allocated time slices in a given window (e.g., due to a virtual machine waiting on an I/O operation, a virtual machine completing its work early, etc.), the low active thread count virtual machines, being scheduled earlier in the window, are more likely to be granted additional time to execute in the unused time remaining in the window.

In addition, in some embodiments, prioritization may be implemented by favoring low active thread count virtual machines when dispatching virtual machines above their entitled capacities. In some embodiments, for example, such prioritization may include applying a priority boost to a virtual machine in the allocation of time above entitlement. Such a priority boost may be beyond any other priority applied by a customer. A priority boost may, for example, be used to break a tie between two virtual machines assigned the same priority.

Further, in some embodiments, dispatch of low active thread count virtual machines may be favored by dispatching virtual processors with the best processor affinity. With a single-threaded workload, cache misses tend to stall a processor core more than with a multi-threaded workload since multiple threads requesting data from a cache generally can request multiple cache lines concurrently.

Other embodiments may implement prioritization in different manners, including other manners of increasing the amount of time allotted to a virtual machine in a dispatch window, increasing the amount of time allotted to a virtual machine beyond some entitlement, altering the order or placement of a virtual machine in a dispatch window, or in other manners that would be apparent to those of ordinary skill in the art having the benefit of the instant disclosure.

FIG. 5, for example, illustrates an example virtualized computing environment 200 including, from a hardware perspective, a plurality of physical processors 202, with each processor 202 including one or more processor cores 204, and with each processor core 204 including one or more hardware threads of execution 206, as well as additional components such as one or more caches 208 (e.g., L1, L2, L3 caches, shared and/or dedicated caches, instruction, data and/or combined caches, etc.) The processors 202 may be disposed in one or more servers, hosts, nodes, etc., and a hypervisor 210, the functionality of which may be resident on one or more of processors 202, may be used to manage a plurality of virtual machines 212. Each virtual machine may be allocated a portion of the physical processor resources, represented by virtual processors 214, and each virtual processor 214 may be considered to include one or more virtual threads 216 that correspond to hardware threads of execution 206 in a processor 202/processor core 204. Hypervisor 210 may allocate virtual processors 214 and the virtual threads 216 to virtual machines 212, thereby effectively allocating the corresponding hardware threads of execution 206 to the virtual machines. It will be appreciated that additional hardware resources, including memory, I/O devices, etc., are also typically allocated to virtual machines, but are not relevant to the instant discussion.

Each virtual machine 212 may also include an operating system 218 configured to run one or more jobs/applications 220, and within each such job/application 220, one or more software threads 222. Generally hypervisor 210 dispatches virtual machines 212 and the software threads active therein to the hardware threads of execution 206 during time slices allocated to each virtual machine, and when a particular virtual machine executes during its allocated time slice, the operating system 218 therein manages the creation, destruction and execution of the software threads 222 active in the virtual machine.

Figure 6:
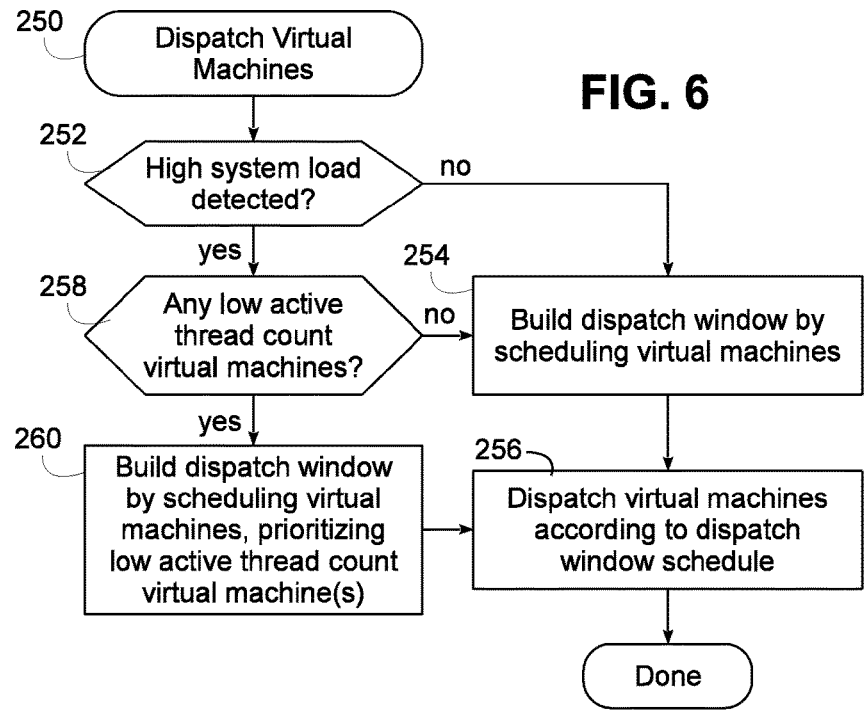
FIG. 6 is a flowchart illustrating an example sequence of operations for dispatching virtual machines in the virtualized computing environment of FIG. 5.

In the illustrated embodiment, low active thread count virtual machines are prioritized in virtualized computing environment 200 using a scheduling algorithm implemented within hypervisor 210 that dispatches virtual machines to execute on their allocated hardware resources. FIG. 6, for example, illustrates an example sequence of operations 250 for dispatching virtual machines in a given dispatch window, which may be called at the beginning of each dispatch window. At the beginning of a dispatch window, for example, block 252 may determine whether a high system load condition is detected, i.e., whether the load on the virtualized computing environment, including the load on the overall environment, the load on a particular server/host/node, or the load on a particular processor or processor core, is above a level at which prioritization of low active thread count virtual machines should be performed. If not, control passes to block 254 to build the dispatch window by scheduling virtual machines in a conventional manner, e.g., by allocating equal slices of time to each active virtual machine. Control then passes to block 256 to dispatch the virtual machines according to the schedule, and the sequence of operations is complete.

Returning to block 252, if a high system load is detected, control instead passes to block 258 to determine whether any low active thread count virtual machines are to be scheduled in the dispatch window. If not, control passes to block 254 to build the dispatch window in a conventional manner. Otherwise, block 258 passes control to block 260 to build the dispatch window by scheduling virtual machines, but also prioritizing any low active thread count virtual machines detected in block 258, e.g., by ordering such virtual machines earlier in the dispatch window, by allocating additional time, such as additional time above entitled capacity, to such virtual machines, or in any of the other manners discussed herein. Control then passes to block 256 to dispatch the virtual machines according to the schedule developed in block 260, whereby the sequence of operations is thereafter complete.

Figure 8:
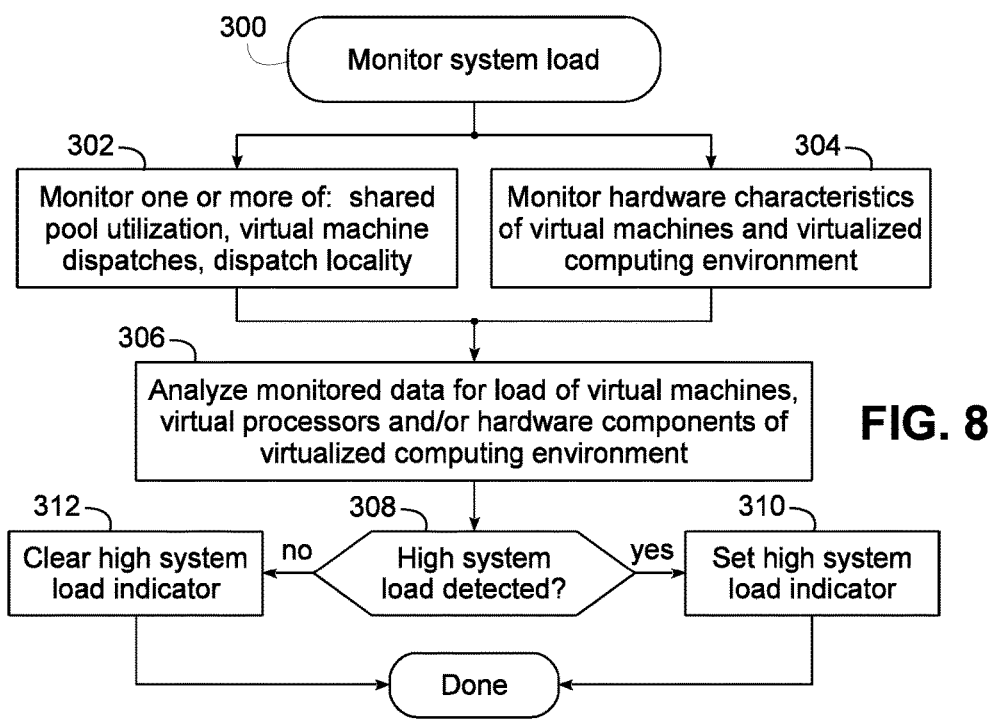
FIG. 8 is a flowchart illustrating an example sequence of operations for monitoring system load in the virtualized computing environment of FIG. 5.
Figure 7:
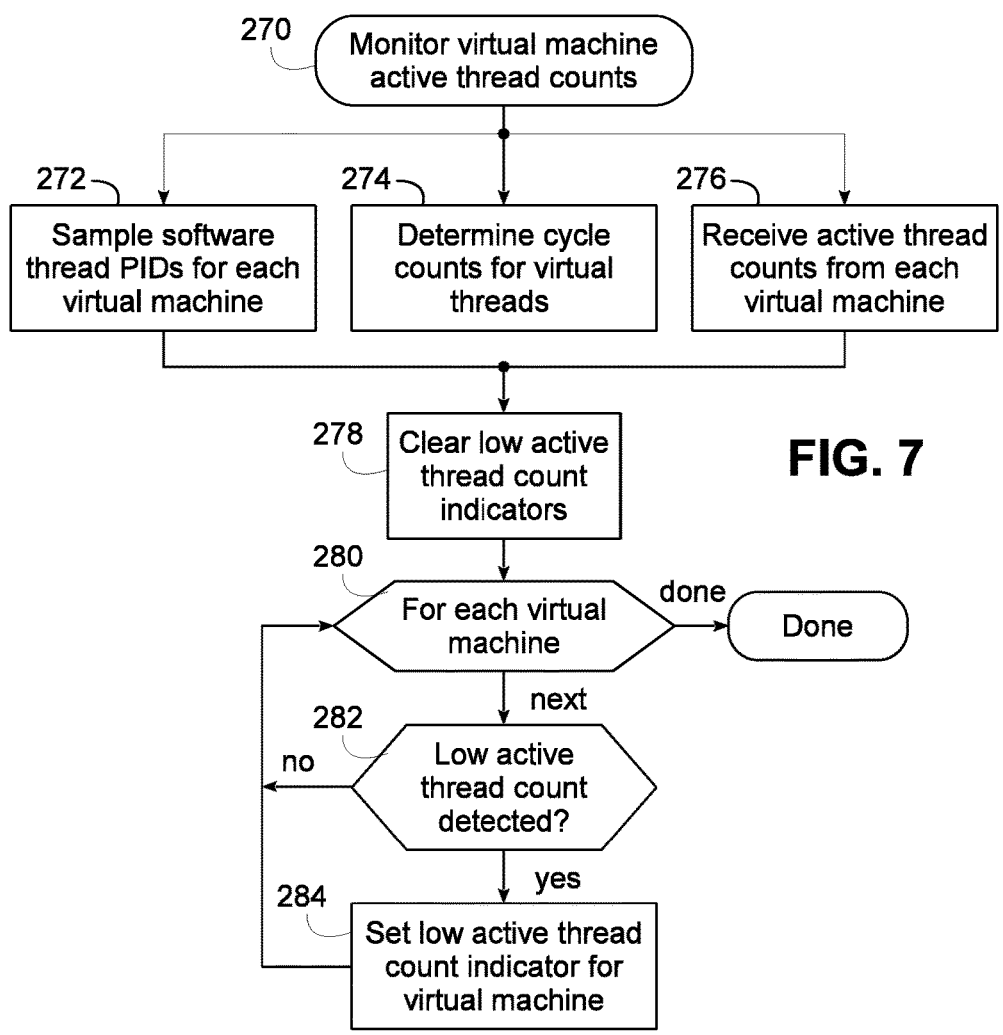
FIG. 7 is a flowchart illustrating an example sequence of operations for monitoring virtual machine thread counts in the virtualized computing environment of FIG. 5.

As should be apparent from FIG. 6, two conditions generally are precedent to prioritizing low active thread count virtual machines: (1) that one or more active virtual machines managed by a hypervisor are low active thread count virtual machines, and (2) that a high system load condition is present. FIGS. 7 and 8 respectively illustrate example sequences of operations that may be used to monitor and detect each of these conditions.

FIG. 7, for example, illustrates a sequence of operations 270 that monitors virtual machine active thread counts. This sequence of operations may be performed, for example, by a hypervisor in a background process and/or thread, and on a periodic or on-demand basis, and may be used to determine which virtual machines have low active software thread counts or high active thread counts.

Blocks 272, 274 and 276 illustrate three potential approaches that may be used to determine whether a virtual machine is a low active thread count virtual machine. Any or all of blocks 272, 274 and 276 may be utilized in different embodiments, and in some embodiments, only one of such blocks may be used. Furthermore, in other embodiments, other approaches for detecting whether a virtual machine has a low active thread count may be used. Therefore, the invention is not limited to the particular approaches discussed herein.

As one example, block 272 samples software thread process identifiers (PIDs) for each virtual machine. It will be appreciated that some environments a hypervisor communicates a PID to the hardware for translation or other purpose, and as such, in some embodiments it may be desirable for the hypervisor to sample the last active PID over time, and thereafter heuristically determine virtual machines and/or individual virtual processors with low active software thread counts.

As another example, block 274 may determine cycle counts for virtual threads in the virtual processors of each virtual machine. In some environments, for example, a hypervisor may have access to counts of cycles consumed by each virtual thread in each virtual processor. If a virtual machine runs at higher utilization levels without exploiting some subset of the potential virtual threads based upon low cycle counts for those virtual threads, the hypervisor may heuristically determine that the virtual machine has a low active thread count.

As yet another example, block 276 may receive active thread counts from each virtual machine. In some environments, for example, virtual machines may be configured to monitor and communicate their respective active thread counts (e.g., based upon run queue lengths) to the hypervisor. As such, determining the number of active threads for a virtual machine by a hypervisor may simply include retrieving an active thread count from that virtual machine.

Irrespective of how active thread counts are compiled, control next passes to block 278 to clear low active thread count indicators for active virtual machines managed by the hypervisor, and block 280 initiates a FOR loop to check each virtual machine. For each such virtual machine, block 280 passes control to block 282 to determine whether a low active thread count condition is detected for the virtual machine. If so, control passes to block 284 to set the low active thread count indicator for that virtual machine, and return control to block 280 to process the next virtual machine. If not, block 282 bypasses block 284 and returns control to block 280. Once all virtual machines have been processed, sequence of operations 270 is complete.

As such, in the illustrated embodiment, sequence of operations 270 builds a set of indicators for the active virtual machines that indicates, for each virtual machine, whether or not that virtual machine is currently considered to have a low active thread count. As such, the determination of whether any low active thread count virtual machines exist in block 258 of FIG. 6, or the determination of which virtual machines to prioritize in block 260 of FIG. 6, may include simply accessing the corresponding indicator for each virtual machine. It will be appreciated, however, that other data structures and/or techniques may be used to determine whether a virtual machine is a low active thread count virtual machine based upon the data collected in blocks 272, 274 and/or 276. For example, actual active thread counts may be determined and stored such that blocks 258-260 of FIG. 6 compare the active thread counts against a threshold (e.g., a threshold that defines a low active thread count condition as being one where only one or two threads are active for a given virtual machine.) In still other embodiments, active thread counts may be averaged over time. Additional techniques for determining low active thread counts may include, for example, hardware assist sampling, hypervisor detection of when an operating system in a virtual machine "naps" a thread, etc.

FIG. 8 illustrates a sequence of operations 300 that monitors system load. This sequence of operations may be performed, for example, by a hypervisor in a background process and/or thread, and on a periodic or on-demand basis, and may be used to determine when a period of high system load exists that is sufficient to trigger low active thread count virtual machine prioritization in block 252 of FIG. 6. Sequence of operations 300, in particular, is configured to determine points in time when the load on the system begins to negatively impact the performance of low active thread count virtual machines. As such, a "high" system load within the context of the present disclosure refers to a system load that is sufficient to adversely impact the performance of a low active thread count virtual machine, and it will be appreciated that what is considered to be "high" for one virtualized computing environment may be different from that for another such virtualized computing environment.

Blocks 302 and 304 illustrate two potential approaches that may be used to determine high system load. Both of blocks 302 and 304 may be utilized in different embodiments, and in some embodiments, only one of such blocks may be used. Furthermore, in other embodiments, other approaches for detecting high system load whether a virtual machine has a low active thread count may be used. Therefore, the invention is not limited to the particular approaches discussed herein.

As one example, block 302 may monitor one or more performance metrics, including but not limited to shared pool utilization, number of unique virtual machines dispatched within a time window, and a measure of the locality of virtual machine dispatches against non-local core resources. It will be appreciated that overhead may be present, for example, when a large number of unique virtual machines and/or virtual processors are dispatched in short time windows against a smaller number of processors, as doing so tends to pressure on-chip processor caches. As another example, overhead may be present when many virtual machine and/or virtual processor dispatches occur against non-local processor resources. As such, any other performance metrics that are relevant to such types of overhead may be used in other embodiments, such as a measure of cache replacement pressure with respect to the usage by virtual machines (e.g. cache directory tagging associated with virtual machines and implicit measures of pressure due to virtual machine switching), or other measures related to virtual machine affinity to memory resources and/or shared pool utilization.

As another example, block 304 monitors hardware characteristics of both virtual machines and of the virtualized computing environment, with the hardware characteristics of the virtual machines measured over time and compared with correlated hardware characteristics of the virtualized computing environment. Such hardware characteristics may include, but are not limited to, hardware characteristics such as cache miss rates, memory controller loads, etc. Moreover, such characteristics may be tracked on a system-wide basis, as well as on a processor, machine, server, node, etc. basis.

Regardless of how the data used to determine the system load is monitored and collected, blocks 302 and 304 pass control to block 306 to analyze the monitored data for the relative load of the active virtual machines, virtual processors and/or hardware components of the virtualized computing environment. Block 308 then determines whether a high system load is detected (where the high system load may be limited to the system load of only a portion of the virtualized computing environment that is being used by low active thread count virtual machines), and if so, passes control to block 310 to set a high system load indicator. If not, block 308 passes control to block 312 to clear the high system load indicator. Sequence of operations 300 is then complete. As such, in the illustrated embodiment, a determination of high system load in block 252 of FIG. 6 may simply include accessing the high system load indicator. In other embodiments, however, other techniques may be used to indicate and/or detect high system load, so the invention is not limited to the particular techniques disclosed herein.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method of scheduling virtual machines in a virtualized computing environment, the method comprising:
   determining that a first virtual machine among a plurality of virtual machines active in the virtualized computing system has a low active thread count, wherein determining that the first virtual machine among the plurality of virtual machines has a low active thread count includes determining that a workload of the first virtual machine is currently on a low number of active software threads, wherein the first virtual machine includes a multi-threading aware operating system, and wherein the low number of active software threads is insufficient for the multi-threading aware operating system to spread out onto available hardware threads of execution for the first virtual machine;
   determining that a high system load exists in the virtualized computing environment; and
   in response to determining that the high system load exists in the virtualized computing environment, prioritizing scheduling of the first virtual machine over at least one other virtual machine among the plurality of virtual machines active in the virtualized computing system based upon the determination that the first virtual machine has the low active thread count.

2. The method of claim 1, wherein determining that the first virtual machine has a low active thread count comprises:
   sampling process identifiers for threads scheduled on one or more processors in the virtualized computing environment; and
   determining that the first virtual machine has a low active thread count based upon the sampled process identifiers.

3. The method of claim 2, wherein determining that the first virtual machine has a low active thread count includes determining that a first virtual processor for the first virtual machine has a low active thread count.

4. The method of claim 1, wherein determining that the first virtual machine has a low active thread count comprises:
   monitoring counts of cycles consumed by a plurality of threads in a virtual processor; and
   determining that the first virtual machine runs at a higher utilization level without exploiting at least a subset of the plurality of threads in the virtual processor.

5. The method of claim 1, wherein determining that the first virtual machine has a low active thread count comprises:
   in a hypervisor, receiving an active thread count from the first virtual machine; and
   determining that the first virtual machine has a low active thread count based upon the received active thread count.

6. The method of claim 1, wherein determining that the high system load exists in the virtualized computing environment comprises determining when system load in the virtualized computing environment impacts performance of low active thread count virtual machines.

7. The method of claim 6, wherein determining when system load in the virtualized computing environment impacts performance of low active thread count virtual machines comprises monitoring one or more performance metrics in the virtualized computing environment.

8. The method of claim 7, wherein the one or more performance metrics includes shared pool utilization, number of unique virtual machines dispatched within a time window and/or a measure of the locality of the virtual machine dispatches against non-local core resources.

9. The method of claim 6, wherein determining when system load in the virtualized computing environment impacts performance of low active thread count virtual machines comprises detecting dispatches of many virtual machines and/or virtual processors on one or more processors over a time window.

10. The method of claim 6, wherein determining when system load in the virtualized computing environment impacts performance of low active thread count virtual machines comprises detecting dispatches of many virtual machines and/or virtual processors against non-local processor resources.

11. The method of claim 6, wherein determining when system load in the virtualized computing environment impacts performance of low active thread count virtual machines comprises:
   determining one or more hardware characteristics of the first virtual machine;
   determining one or more hardware characteristics of the virtualized computing environment; and
   comparing the determined one or more hardware characteristics of the first virtual machine with the determined one or more hardware characteristics of the virtualized computing environment.

12. The method of claim 1, wherein prioritizing scheduling of the first virtual machine over at least one other virtual machine among the plurality of virtual machines active in the virtualized computing system based upon the determination that the first virtual machine has the low active thread count includes scheduling the first virtual machine earlier in a dispatch window than the at least one other virtual machine based upon the determination that the first virtual machine has the low active thread count.

13. The method of claim 1, wherein prioritizing scheduling of the first virtual machine over at least one other virtual machine among the plurality of virtual machines active in the virtualized computing system based upon the determination that the first virtual machine has the low active thread count includes boosting priority of the first virtual machine based upon the determination that the first virtual machine has the low active thread count.

14. The method of claim 13, wherein boosting priority of the first virtual machine based upon the determination that the first virtual machine has the low active thread count includes boosting an allocated time for the first virtual machine above entitlement.

15. The method of claim 1, wherein the first virtual machine has a batch workload handled by a single thread.

16. The method of claim 1, wherein determining that the first virtual machine has the low active thread count, determining that the high system load exists in the virtualized computing environment, and prioritizing scheduling of the first virtual machine are performed by a hypervisor resident in a multi-threaded microprocessor.

17. A method of scheduling virtual machines in a virtualized computing environment, the method comprising:
   determining that a first virtual machine among a plurality of virtual machines active in the virtualized computing system has a low active thread count, wherein determining that the first virtual machine among the plurality of virtual machines has a low active thread count includes determining that a workload of the first virtual machine is currently on a low number of active software threads, and wherein determining that the first virtual machine has a low active thread count comprises:
   sampling process identifiers for threads scheduled on one or more processors in the virtualized computing environment; and
   determining that the first virtual machine has a low active thread count based upon the sampled process identifiers;
   determining that a high system load exists in the virtualized computing environment; and
   in response to determining that the high system load exists in the virtualized computing environment, prioritizing scheduling of the first virtual machine over at least one other virtual machine among the plurality of virtual machines active in the virtualized computing system based upon the determination that the first virtual machine has the low active thread count.

18. The method of claim 17, wherein determining that the first virtual machine has a low active thread count includes determining that a first virtual processor for the first virtual machine has a low active thread count.

19. The method of claim 17, wherein prioritizing scheduling of the first virtual machine over at least one other virtual machine among the plurality of virtual machines active in the virtualized computing system based upon the determination that the first virtual machine has the low active thread count includes scheduling the first virtual machine earlier in a dispatch window than the at least one other virtual machine based upon the determination that the first virtual machine has the low active thread count.

20. The method of claim 17, wherein prioritizing scheduling of the first virtual machine over at least one other virtual machine among the plurality of virtual machines active in the virtualized computing system based upon the determination that the first virtual machine has the low active thread count includes boosting priority of the first virtual machine based upon the determination that the first virtual machine has the low active thread count.

* * * * *